Dec. 21, 1926.
H. V. LOUGH
1,611,355
ATTACHMENT FOR TIRE BUILDING MACHINES
Filed Jan. 16, 1923
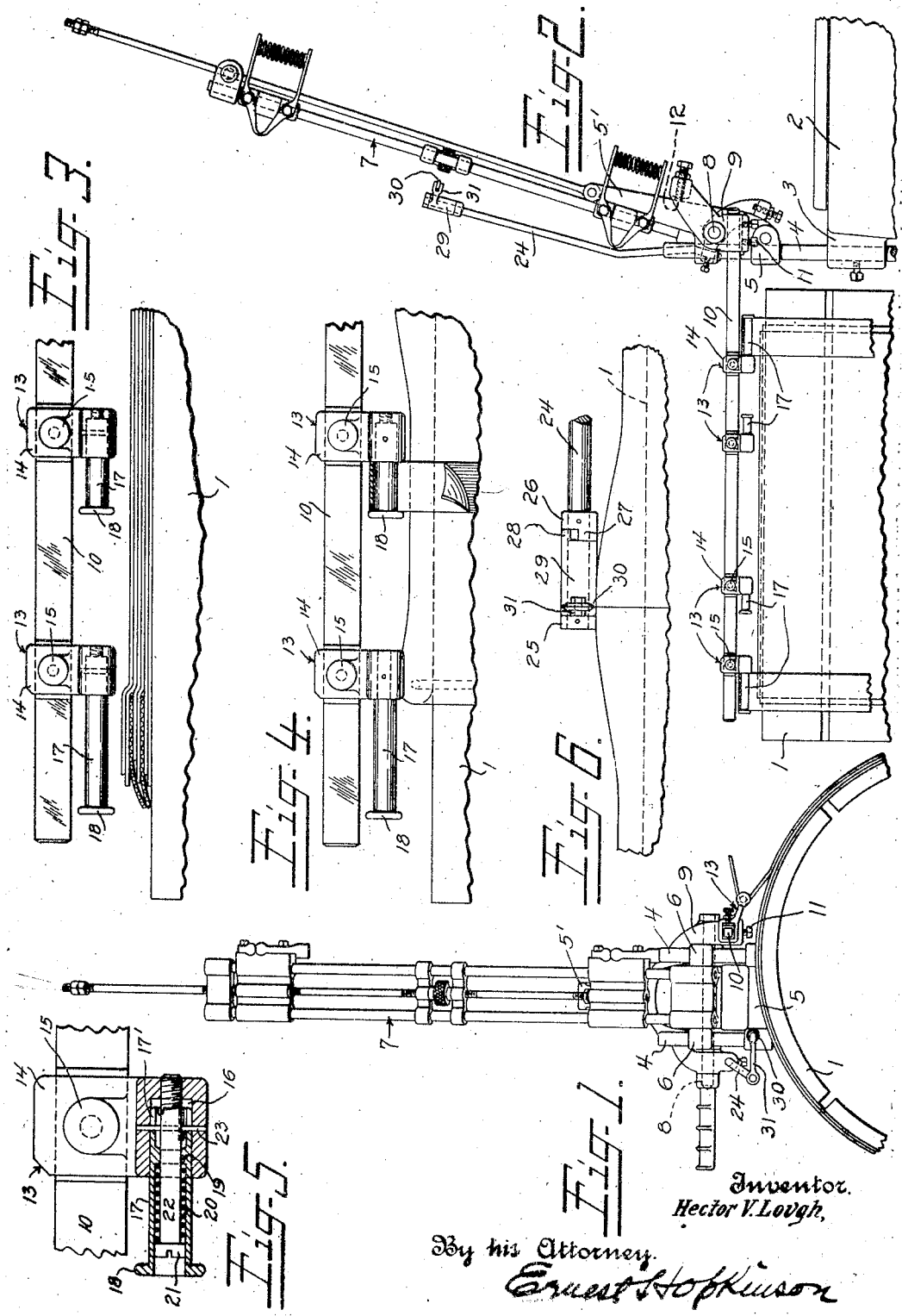
Inventor.
Hector V. Lough,
By his Attorney
Ernest Hopkinson Patented Dec. 21, 1926.

1,611,355

UNITED STATES PATENT OFFICE.

HECTOR V. LOUGH, OF HARTFORD, CONNECTICUT, ASSIGNOR TO THE HARTFORD RUBBER WORKS COMPANY, OF HARTFORD, CONNECTICUT, A CORPORATION OF CONNECTICUT.

ATTACHMENT FOR TIRE-BUILDING MACHINES.

Application filed January 16, 1923. Serial No. 612,933.

This invention relates to tire building machines of the drum type, in which the carcass is assembled and built up in a flat cylindrical form substantially straight from bead to bead.

The object of the invention is to provide for such machines an attachment facilitating certain of the building operations, thereby lessening the cost of their production. More specifically, the object of the invention is to enable strips of material (other than the plies of stock that form the carcass) to be applied thereto either temporarily or permanently, or both, and in exactly the position required by the task. It aims also to permit reversing or turning the strips while applying them to the carcass so that the drum may be rotated in the same direction as it is when the plies of stock are superimposed thereon, thereby better adapting the attachment to the operation.

With the illustrated embodiment in mind and without intention to limit more than is required by the prior art, the invention briefly consists in an arm that can be swung from an unobstructing position at one side of the building drum to a position immediately adjacent the same, this arm carrying one or more strip guiding devices which may be adjustable as to width to adapt them to handle strips of different breadth, the strip guiding devices being also preferably adjustable on the arm to adapt them for use in connection with the building of all sizes of casings.

An embodiment of the invention is illustrated in the accompanying drawings, in which:—

Fig. 1 is an end elevation of the attachment shown in inoperative or unobstructing position with relation to a building drum only a part of which appears in the drawing;

Fig. 2 is a front elevation of the attachment, showing the arm carrying a plurality of strip guides in an operative position immediately above the drum;

Figs. 3 and 4 illustrate a part of the attachment arm in working relation to the drum on which the carcass appears, in the former, in a condition ready to receive the bead wires, and in the latter, in a finished condition with the margins of the plies folded to out the bead wires;

Fig. 5 is a section taken longitudinally through one of the strip guides to show a preferred adjustable supporting construction therefor;

And Fig. 6 is a fragmentary front elevation of a tread centering roller.

The attachment of the present invention is intended for use in connection with the "pulley-band" process of making casings, in which plies of stock, bead members, frequently the tread, and any other constituents of the casing are assembled on a collapsible drum 1, which is rotatably supported from a frame 2, the drum being driven by power in any suitable manner. Such a building machine is disclosed in a prior patent to Ernest Hopkinson, No. 1,310,701, granted July 22nd, 1919, and reference is made thereto for further mechanical details. Vertically adjustable in lugs 3, on the frame 2, are rods 4, carrying a bracket 5, which is clamped to the rods and which has an upright portion 5' for a purpose presently appearing. Between the apertured lugs 6 of the bracket 5, is pivoted a bead wire setting device, indicated generally by the numeral 7. This bead wire setter forms no part of the present invention and is shown in both Figs. 1 and 2, in a raised or inoperative position.

Horizontal in the bracket 5 is a pin 8 on which are fulcrumed, at opposite sides of the bracket, the strip guiding and tread-roller attachments, each movable independently of the other.

The strip guiding attachment comprises a bell-crank lever 9 pivoted on the pin 8, a square rod 10 adjustably secured thereto, as indicated at 11, and an adjustable stop 12 adapted to engage the bracket portion 5' when the rod 10 is substantially parallel to the face of the building drum.

Four strip guides, indicated generally at 13, are shown supported by the rod 10, but, of course, their number may be varied as desired, the outside pair being for locating and applying so-called "bare-backs" and the inside pair for locating and applying a somewhat narrower strip of gum of contrasting color which is temporarily supported on a so-called "Holland" strip that is pulled off after attachment of the gum to the casing.

These strip guides 13, excepting for their width, are of substantially the same construction and a detailed description of one only need be given. Each consists of a sliding bracket and support 14, see Fig. 5, adapted to be clamped, as at 15, to the square rod 10, any desired distance from the margins of the casing being built. The holder 14 is socketed, as at 16, to adjustably sustain a finger or sleeve 17, which projects from one side of the holder and has a free end equipped with a restraining and guiding side flange 18. The finger or sleeve is tubular, but intermediately is plugged to furnish an abutment 19 for a spring 20, confined between it and the head 21 of a screw 22, which is threaded into the bracket holder 14 and anchored by a pin 23. The inner end of the tubular finger 17 is lengthwise slotted to varying extents, as indicated at 17', the slots receiving the cross-pin 23. Thus, the fingers 17, constituting the effective portion of the strip guides, may be readily adjusted to length for the accommodation of strips of different width, the operator having merely to pull and turn the fingers to capacitate them for another width of strip.

The tread guiding attachment, see Figs. 2 and 6, is fulcrumed on the pin 8 exactly in the same way as the strip guiding attachment. A duplicating description, therefore, is superfluous. Its rod 24 carries spaced apart collars 25 and 26, one of which is provided with a lug 27, cooperating with a similar offset 28 on a sleeve 29, to limit downward swinging movement of a roller 30 that is journalled on an arm 31 fixed to the sleeve 29.

The use of the attachment follows. The casings are built of plies of fabric laid flat on the drum. The bead wires are then applied a distance in from the margins and the plies turned over the wires. It is desirable, if not necessary, to make the "turn-overs" in stages, a pair of plies at a time. And the rubberized plies are quite tacky. Hence, "turn-overs" are facilitated by introducing a non-tacky strip of fabric between the plies that are to be separately bent over the wires. The strip guiding attachment facilitates the operation of applying such strips as it enables them to be placed when the drum is operated by power and to be placed accurately so that they will not, subsequently, be caught under the bead wires, which are not put on until all the plies are assembled. The operator slips a strip on the free end of a finger 17, tacks its end in place on the drum and steps on a foot pedal, coupling the drum to a source of power. The strip is reversed and carried under the eye of the builder where faulty laying is immediately visible. What has been said of the strip guides for bare-backs applies to the intermediate pair of strip guides.

The tread of rubber composition, as received from the calender, has a center line marked upon it. With the guiding roller—dropped down into the position shown in Fig. 6—the operator may readily keep the mark thereunder and accurately center the tread by manually turning the drum backward.

Many changes and alterations may be made in the construction above detailed without departing from the principle of the invention and reference should therefore be made to the accompanying claims for an understanding of its scope.

Having thus described my invention, what I claim and desire to protect by Letters Patent is:—

1. In a machine for manufacturing tire casings, a frame, a circular former revolubly supported by the frame, in combination with, a strip guiding attachment, said strip guiding attachment comprising an arm, connections between the arm and frame permitting movement of the arm from an operative position adjacent the circular former to an inoperative unobstructing position, and means on the arm for reversing a strip while guiding and applying it in pre-determined position to a carcass being built on the circular former.

2. In a machine for manufacturing tire casings, a frame, a circular former revolubly supported by the frame, in combination with, a strip guiding attachment, said strip guiding attachment comprising an arm, a flanged finger at one side sustained by the arm through a bracket and fixedly adjustable with respect to the bracket to predetermined lengths and at its other side free to facilitate inserting a strip.

3. In a machine for manufacturing tire casings, a frame, a drum revolubly supported by the frame, in combination with, a strip guiding attachment, said strip guiding attachment comprising an arm, and a device adjustable on the arm for turning a strip while guiding and applying it in pre-determined position to a carcass being built on the drum.

4. In a machine for manufacturing tire casings, a frame, a drum revolubly supported by the frame, in combination with, a strip guiding attachment, said strip guiding attachment comprising an arm pivoted to the frame, and a plurality of turning and directing fingers secured to the arm with their projecting portions parallel to the drum.

5. In a machine for manufacturing tire casings, a frame, a drum revolubly supported by the frame, in combination with, a strip guiding attachment, said strip guiding attachment comprising an arm adapted to be positioned adjacent the drum, and a finger supported by the arm, said finger having an intermediate reduced portion adapted to permit turning and reversing a strip, and projecting portions flanking the reduced portion adapted to guide both edges of a strip whereby to govern its application to a carcass being built.

6. In a machine for manufacturing tire casings, a frame, a drum revolubly supported by the frame, in combination with, a strip guiding attachment, said strip guiding attachment comprising an arm adapted to be shifted to and from the drum, and a bracket supported by the arm carrying a finger parallel to the drum, said finger being lengthwise adjustable fixedly to predetermined lengths with respect to the bracket to accommodate strips of different width.

7. In a machine for manufacturing tire casings, a frame, a drum revolubly supported by the frame, in combination with, a strip guiding attachment, said strip guiding attachment comprising an arm, a bracket adapted to be clamped to said arm, a flanged sleeve angularly adjustable in said bracket, spring means urging said sleeve in one direction, and a pin secured in said bracket limiting movement of said sleeve by said spring means, said sleeve being provided with a plurality of slots in one end and with a flange at its opposite and free end, whereby it is adapted to accommodate strips of various widths to a carcass under formation.

Signed at Hartford, county of Hartford, and State of Connecticut, this 12th day of January, 1923.

HECTOR V. LOUGH.